US012752521B2

(12) United States Patent
Nishimiya et al.

(10) Patent No.: US 12,752,521 B2
(45) Date of Patent: Oct. 6, 2026

(54) LAMINATE AND FROZEN FOOD CONTAINER AND PACKAGING

(71) Applicant: EARTH CREATE CO., LTD., Osaka (JP)

(72) Inventors: Yoshiyuki Nishimiya, Osaka (JP); Yasutaka Yanase, Osaka (JP); Noriyuki Hayashi, Fukui (JP); Kentaro Nagano, Osaka (JP)

(73) Assignee: EARTH CREATE CO., LTD., Osaka (JP)

( * ) Notice: Subject to any disclaimer, the term of this patent is extended or adjusted under 35 U.S.C. 154(b) by 367 days.

(21) Appl. No.: 18/565,386

(22) PCT Filed: Mar. 29, 2022

(86) PCT No.: PCT/JP2022/015637

§ 371 (c)(1), (2) Date: Nov. 29, 2023

(87) PCT Pub. No.: WO2022/254930

PCT Pub. Date: Dec. 8, 2022

(65) Prior Publication Data

US 2024/0262095 A1 Aug. 8, 2024

(30) Foreign Application Priority Data

May 31, 2021 (JP) ................................ 2021-091416

(51) Int. Cl.

*B32B 27/32* (2006.01)
*B32B 27/08* (2006.01)
*B32B 27/20* (2006.01)

(52) U.S. Cl.

CPC .............. *B32B 27/32* (2013.01); *B32B 27/08* (2013.01); *B32B 27/20* (2013.01);
(Continued)

(58) Field of Classification Search

CPC ......... B32B 27/32; B32B 27/08; B32B 27/20; B32B 2250/03; B32B 2250/242;
(Continued)

(56) References Cited

U.S. PATENT DOCUMENTS

2022/0089849 A1 3/2022 Nakamura et al.
2023/0118439 A1 4/2023 Nishimiya et al.

FOREIGN PATENT DOCUMENTS

CN 104292596 A 1/2015
JP 2002-361811 A 12/2002
(Continued)

OTHER PUBLICATIONS

English machine translation for 2016198998. (Year: 2016).*
(Continued)

*Primary Examiner* — Michael C Miggins
(74) *Attorney, Agent, or Firm* — Studebaker Brackett PLLC

(57) ABSTRACT

A laminate according to an aspect of the present invention includes an inner layer and a pair of outer layers laminated on both sides of the inner layer. The inner layer contains an inorganic filler and a first thermoplastic resin. Each of the outer layers contains a second thermoplastic resin. The inorganic filler includes calcium carbonate particles. A content of the inorganic filler in the laminate by ratio is more than 50% by mass. Each of the first thermoplastic resin and the second thermoplastic resin satisfies a specific condition. A total content, by ratio, of a first polyethylene resin, a second polyethylene resin, and a third polyethylene resin satisfying the specific condition in each of the first thermoplastic resin and the second thermoplastic resin is more than 90% by mass.

12 Claims, 1 Drawing Sheet

(52) U.S. Cl.
CPC ..... *B32B 2250/03* (2013.01); *B32B 2250/242* (2013.01); *B32B 2250/40* (2013.01); *B32B 2264/104* (2013.01); *B32B 2274/00* (2013.01); *B32B 2307/72* (2013.01); *B32B 2307/7376* (2023.05); *B32B 2323/04* (2013.01); *B32B 2439/70* (2013.01)

(58) Field of Classification Search
CPC .......... B32B 2250/40; B32B 2264/104; B32B 2274/00; B32B 2307/72; B32B 2307/7376; B32B 2323/04; B32B 2439/70; B32B 2250/24; B32B 2264/10; B32B 2270/00; B32B 2272/00; B32B 2307/546; B32B 2307/558; B32B 1/00; B32B 2307/30; B32B 2439/40; B32B 2553/00; C08L 23/04; C08J 5/18; Y02W 30/80
See application file for complete search history.

(56) References Cited

FOREIGN PATENT DOCUMENTS

| | | | |
|---|---|---|---|
| JP | 2003-220674 | A | 8/2003 |
| JP | 2005-289494 | A | 10/2005 |
| JP | 2008-164114 | A | 7/2008 |
| JP | 2015-134629 | A | 7/2015 |
| JP | 2016-198998 | A | 12/2016 |
| JP | 2018-162350 | A | 10/2018 |
| JP | 2021-037748 | A | 3/2021 |
| JP | 6857428 | B1 | 4/2021 |
| JP | 2021-112862 | A | 8/2021 |
| WO | 2018/042299 | A1 | 3/2018 |
| WO | 2020/195429 | A1 | 10/2020 |

OTHER PUBLICATIONS

English machine translation for 2002361811 (Year: 2002).*
English machine translation for CN 102909925. (Year: 2013).*
An Office Action; "Notice of Reasons for Revocation," mailed by the Japanese Patent Office on Sep. 20, 2022, which corresponds to Japanese Patent Application No. 2021-091416 and is related to U.S. Appl. No. 18/565,386; with English language translation.
An Office Action; "Notice of Reasons for Revocation," mailed by the Japanese Patent Office on Feb. 13, 2023, which corresponds to Japanese Patent Application No. 2021-091416 and is related to U.S. Appl. No. 18/565,386; with English language translation.
The extended European search report issued by the European Patent Office on Jul. 19, 2024, which corresponds to European Patent Application No. 22815687.3-1102 and is related to U.S. Appl. No. 18/565,386.
Complied by the Production Department of China Petrochemical Corporation; "Synthetic Resin Service Guide"; Jun. 30, 1997; total 6 pages; 1st Edition; China Petrochecmical Press.
An Office Action; mailed by the China National Intellectual Property Administration of the People's Republic of China on Jun. 27, 2025, which corresponds to Chinese Patent Application No. 202280039136.6 and is related to U.S. Appl. No. 18/565,386.
International Search Report issued in PCT/JP2022/015637; mailed Jun. 21, 2022.
Japanese Industrial Standards Committee; "Plastics—Polyethylene (PE) moulding and extrusion materials—Part 1: Designation system and basis for specifications;" JIS K 6922-1: 2018; issued by Japanese Standards Association; revised Jun. 20, 2018; p. 5.
An Office Action mailed by China National Intellectual Property Administration on Mar. 7, 2026, which corresponds to Chinese Patent Application No. 202280039136.6 and is related to U.S. Appl. No. 18/565,386; with English language translation.

* cited by examiner

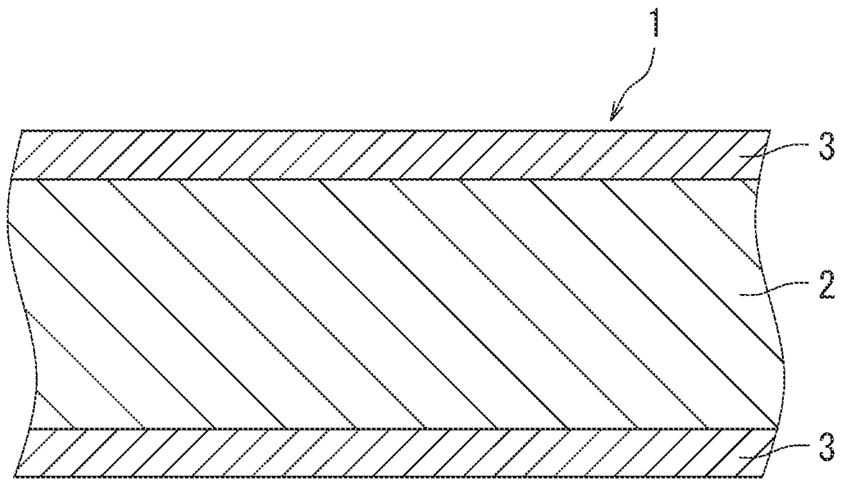
1
3
2
3

LAMINATE AND FROZEN FOOD CONTAINER AND PACKAGING

TECHNICAL FIELD

The present invention relates to a laminate and frozen food container and packaging.

BACKGROUND ART

In recent years, as the demand for frozen food has increased, the demand for containers for containing frozen food and packaging for wrapping frozen food has also increased. Hereinafter, such containers and packaging may be collectively referred to as frozen food container and packaging. The frozen food container and packaging are obtained, for example, by forming a sheet-like material containing thermoplastic resins. Examples of the thermoplastic resins include polyethylene resins, polypropylene resins, and polystyrene resins. The sheet-like material may hereinafter be referred to as a material sheet.

The frozen food container and packaging are required to have moderately high rigidity from the viewpoint of enhancing ease of handling during production and cooking of frozen food. Frozen foods are also assumed, in the distribution stage thereof, to be subject to vibration during transportation, and to be accidentally dropped by consumers or distributors. The frozen food container and packaging are accordingly required to have performance that is hardly affected by breakage even when impact is applied in a low temperature state. The low temperature state is, for example around −20° C. The performance may hereinafter be referred to as "cold impact resistance". Frozen food container and packaging are also gradually required to be environmentally friendly due to the recent heightened awareness of the environment. In view of the above, the material sheet as the material for the frozen food container and packaging is also required to be excellent at rigidity and cold impact resistance, and to have a low environmental load. The material sheet is also naturally required to have excellent formability.

A material sheet has been proposed in response to such demands (e.g., Patent Literature 1). The material sheet has, for example a three-layer structure whose central layer contains blended ingredients such as a small amount of inorganic filler (such as talc), a block polypropylene resin, and a polyethylene resin. Patent Literature 1 states that the material sheet in question is excellent at cold impact resistance.

CITATION LIST

Patent Literature

Patent Literature 1: JP 2021-37748 A

SUMMARY OF INVENTION

Technical Problem

The present inventor's investigation however revealed that the material sheet described in Patent Literature 1 does not fully satisfy all of formability, cold impact resistance, and rigidity. The material sheet described in Patent Literature 1 also has a relatively high load on the environment because resins are used as a main ingredient.

The present invention has been achieved in view of the above circumstances, and an object thereof is to provide a laminate that is excellent at formability, cold impact resistance, and rigidity and that has a low environmental load, and frozen food container and packaging formed by the laminate.

Solution to Problem

A laminate according to an aspect of the present invention includes an inner layer and a pair of outer layers laminated on both sides of the inner layer. The inner layer contains an inorganic filler and a first thermoplastic resin. Each of the outer layers contains a second thermoplastic resin. The inorganic filler includes calcium carbonate particles. A content of the inorganic filler in the laminate by ratio is more than 50% by mass. Each of the first thermoplastic resin and the second thermoplastic resin satisfies Condition A or B below.

Condition A is that a first polyethylene resin is contained, and the first polyethylene resin is 0.942 $g/cm^3$ or more and 0.970 $g/cm^3$ or less in density as well as 2.0 or more and 10.0 or less in polydispersity index (Mw/Mn).

Condition B is that: a second polyethylene resin and a third polyethylene resin are contained; the second polyethylene resin is 0.942 $g/cm^3$ or more and 0.970 $g/cm^3$ or less in density as well as more than 10.0 and 50.0 or less in polydispersity index (Mw/Mn); the third polyethylene resin is 0.850 $g/cm^3$ or more and less than 0.930 $g/cm^3$ in density; and a ratio of mass of the third polyethylene resin to total mass of the second polyethylene resin and the third polyethylene resin is 5% by mass or more and 30% by mass or less.

Here, a total content, by ratio, of the first polyethylene resin, the second polyethylene resin, and the third polyethylene resin in each of the first thermoplastic resin and the second thermoplastic resin is more than 90% by mass.

Frozen food container and packaging according to an aspect of the present invention are formed by forming the laminate described above.

Advantageous Effects of Invention

The laminate according to the aspect of the present invention is excellent at formability, cold impact resistance, and rigidity and has a low environmental load. The frozen food container and packaging according to the aspect of the present invention are excellent at cold shock resistance and rigidity and have a low environmental load.

BRIEF DESCRIPTION OF DRAWINGS

FIGURE is a cross-sectional view illustrating an example of structure of a laminate according to an aspect of the present invention.

DESCRIPTION OF EMBODIMENTS

Embodiments of the present invention will be described below. However, the present invention is by no means limited by the embodiments, and can be implemented with appropriate modifications within the scope of the purpose of the present invention. Each ingredient described in the embodiments of the present invention may be used singly or in combination of two or more unless otherwise specified.

As used herein, the density of a polyethylene resin indicates a value measured according to JIS (Japanese Industrial Standards) K7112:1999. A polyethylene resin is a resin formed by a monomer containing ethylene as a main ingredient (for example, a monomer containing 80% by mass or more of ethylene).

The molecular weight (mass-average molecular weight and number-average molecular weight) of a resin is a value measured by a high temperature GPC (size-exclusion chromatography), as follows:

[Measuring device] "HLC-8321GPC/HT" manufactured by Tosoh Corporation;

[GPC column] "TSKgel (registered Japanese trademark) GMHHR-H(20)HT" manufactured by Tosoh Corporation;

[Eluent] 1,2,4-trichlorobenzene (TCB);

[Column temperature] 140° C.;

[Detector] Differential refractometer (RI);

[Flow rate] 1 mL/min;

[Injection volume] 300 μL; and

[Standard sample] Standard polystyrene (converted by the Q value of polyethylene).

First Embodiment: Laminate

A laminate according to a first embodiment of the present invention includes an inner layer and a pair of outer layers laminated on both sides of the inner layer. The inner layer contains an inorganic filler and a first thermoplastic resin. Each of the outer layers contains a second thermoplastic resin. The inorganic filler includes calcium carbonate particles. A content of the inorganic filler in the laminate by ratio is more than 50% by mass. Each of the first thermoplastic resin and the second thermoplastic resin satisfies Condition A or B below.

Condition A is that a first polyethylene resin is contained, and the first polyethylene resin is 0.942 g/cm$^3$ or more and 0.970 g/cm$^3$ or less in density as well as 2.0 or more and 10.0 or less in polydispersity index (Mw/Mn).

Condition B is that: a second polyethylene resin and a third polyethylene resin are contained; the second polyethylene resin is 0.942 g/cm$^3$ or more and 0.970 g/cm$^3$ or less in density as well as more than 10.0 and 50.0 or less in polydispersity index (Mw/Mn); the third polyethylene resin is 0.850 g/cm$^3$ or more and less than 0.930 g/cm$^3$ in density; and a ratio of mass of the third polyethylene resin to total mass of the second polyethylene resin and the third polyethylene resin is 5% by mass or more and 30% by mass or less.

Hereinafter, a polyethylene resin that is 0.942 g/cm$^3$ or more and 0.970 g/cm$^3$ or less in density may be referred to as a "high density polyethylene resin". A polyethylene resin that is 0.850 g/cm$^3$ or more and less than 0.930 g/cm$^3$ in density may be referred to as a "low density polyethylene resin".

The laminate of the present invention may be employed as a material for container and packaging, for example. The laminate of the present invention is suitable as a material for food container and packaging (especially frozen food container and packaging). Specifically, the container and packaging can be obtained by forming the laminate of the present invention into a desired shape. Examples of a forming method of the laminate of the present invention include vacuum forming, pressure forming, and matched mold forming.

Hereinafter, the details of the laminate of the present invention will be described with reference to the drawings. FIGURE is a cross-sectional view of a laminate 1 that is an example of the laminate of the present invention. The laminate 1 includes an inner layer 2 and a pair of outer layers 3 laminated on both sides of the inner layer 2. The details of the laminate of the present invention have been described above with reference to the drawings. However, the structure of the laminate of the present invention is not limited to the structure of the laminate 1 illustrated in FIGURE. For example, the laminate of the present invention may further include, in addition to the inner layer and the pair of outer layers, different layers. Examples of the different layers include protective layers covering the outer layers.

The laminate of the present invention, which satisfies the above-described configuration, is excellent at formability, cold impact resistance, and rigidity, and has a low environmental load. The reason why the laminate of the present invention has the above effects is presumed as follows. The laminate of the present invention contains an inorganic filler and a thermoplastic resin. A content ratio of the inorganic filler in the laminate of the present invention is more than 50% by mass. The laminate of the present invention has a low environmental load because a resin contained ratio is low and the emitted amount of carbon dioxide during incineration is relatively low. Here, containers and packaging are classified based on the ingredient that accounts for the largest percentage by mass according to "The Containers and Packaging Recycling Law". In addition, specific containers and packaging (for example, glass containers, paper containers and packaging, PET bottles, and plastic containers and packaging) are obliged to recycle. On the other hand, the container and packaging formed by the laminate of the present invention do not correspond to the specific containers and packaging for which the recycling obligation is imposed, because the inorganic filler accounts for the largest percentage by mass. Furthermore, as described above, the container and packaging formed by the laminate of the present invention emits relatively little carbon dioxide when incinerated. Therefore, the container and packaging formed by the laminate of the present invention can be disposed of as combustible or non-combustible waste, and the disposal cost is low.

Here, the inorganic filler functions as a filler, and therefore material sheets containing a small amount of inorganic filler and thermoplastic resin tend to have excellent cold impact resistance and rigidity. However, in a material sheet containing a large amount of inorganic filler and thermoplastic resin, the thermoplastic resin tends to lose strength and function as a binder resin at low temperatures, resulting in reduced cold impact resistance. As a result of intensive studies, the present inventors found that by using a thermoplastic resin that satisfies specific conditions, even a material sheet to which a large amount of inorganic filler is added can exhibit sufficient cold impact resistance, so that the present inventors have completed the present invention.

Specifically, in the laminate of the present invention, the inner layer contains the inorganic filler and the first thermoplastic resin, and each outer layer contains the second thermoplastic resin. Each of the first thermoplastic resin and the second thermoplastic resin contains the high density polyethylene resin. The high density polyethylene resin is excellent at strength and rigidity at room temperature, and is also excellent at cold resistance. Among them, the high density polyethylene resin (first polyethylene resin) having a small polydispersity index (Mw/Mn) can sufficiently maintain excellent strength and function as a binder resin at low temperatures. Therefore, the high density polyethylene resin having a small polydispersity index (Mw/Mn) is suitable as the first thermoplastic resin and the second thermoplastic resin (Condition A).

On the other hand, the high density polyethylene resin (second polyethylene resin) having a large polydispersity index (Mw/Mn) is difficult to maintain its strength and function as a binder resin at low temperatures. Therefore, the second polyethylene resin alone is not suitable as the first thermoplastic resin and the second thermoplastic resin. However, a mixed resin obtained by adding a low-density polyethylene resin (third polyethylene resin) to a high-density polyethylene resin having a large polydispersity index (Mw/Mn) exhibits excellent stickiness at low temperatures. Therefore, the mixed resin can sufficiently maintain excellent strength and function as a binder resin at low temperatures. The mixed resin however tends to have lower rigidity at room temperature if the addition amount of the low-density polyethylene resin is excessive. From the above, a specific mixed resin is suitable as the first thermoplastic resin and the second thermoplastic resin where the specific mixed resin contains the high-density polyethylene resin with a large polydispersity index (Mw/Mn) and a low-density polyethylene resin whose compound ratio is in a specific range (Condition B).

In summary, each of the first thermoplastic resin and the second thermoplastic resin satisfies Condition A or Condition B, whereby the laminate of the present invention can achieve both excellent cold impact resistance and rigidity.

Furthermore, the laminate of the present invention has a three-layer structure including the inner layer and the pair of outer layers. Here, a material sheet containing a large amount of inorganic filler tends to have lower formability (particularly stretchability) than a material sheet containing no inorganic filler. Specifically, even if a material sheet containing a large amount of inorganic filler is stretched at a high magnification (for example, about 4 times), it may not be sufficiently stretched and holes may be formed therein. In contrast, in the laminate of the present invention, the inner layer is covered with the pair of outer layers. The pair of outer layers does not contain a large amount of inorganic filler unlike the inner layer, and the laminate is therefore excellent at stretchability. Therefore, in the laminate of the present invention, holes penetrating the laminate are less likely to be formed even if the inner layer is not sufficiently stretched when the laminate of the present invention is stretched at a high magnification.

Note that the laminate of the present invention is excellent at heat resistance because the inorganic filler functions as a filler. The laminate of the present invention can therefore be used as food container and packaging for microwave heating, for example. The laminate of the present invention is also excellent at acid resistance because the surfaces (outer layers) thereof are layers containing resin as a main ingredient. The laminate of the present invention can therefore be used as food container and packaging that come into contact with acidic foods (pickled plums, lemons, etc.).

The total thickness of the laminate of the present invention is preferably 200 μm or more and 1000 μm or less, and more preferably 250 μm or more and 800 μm or less. The cold impact resistance of the laminate of the present invention can be further improved in the case where the total thickness of the laminate of the present invention is 200 μm or more. The weight of container and packaging formed by the laminate of the present invention can be reduced in the case where the total thickness of the laminate of the present invention is 1000 μm or less.

[Inner Layer]

The inner layer contains an inorganic filler and a first thermoplastic resin. The first thermoplastic resin functions as a binder resin in the inner layer.

The thickness of the inner layer is preferably 150 μm or more and 800 μm or less, and more preferably 220 μm or more and 700 μm or less. The inner layer being 150 μm or more in thickness enables further improvement in the cold impact resistance of the laminate of the present invention. The inner layer being 800 μm or less in thickness enables further improvement in the formability of the laminate of the present invention.

(Inorganic Filler)

The inorganic filler contains calcium carbonate particles. Here, the purity of the calcium carbonate particles used as the inorganic filler varies greatly depending on the source of purchase. Specifically, most of the calcium carbonate particles used as the inorganic filler are obtained by directly granulating calcium carbonate ore obtained as mineral resources without refining. Therefore, the purity of calcium carbonate particles varies greatly depending on the place of production. There is, for example low-purity calcium carbonate particles whose calcium carbonate content by ratio is about 70% by mass although depending on the production area. On the other hand, high-purity calcium carbonate particles obtained by chemical synthesis are provided as calcium carbonate particles for food and medicine.

The laminate of the present invention preferably contains calcium carbonate particles with a purity as high as possible. Specifically, the content of calcium carbonate in the calcium carbonate particles by ratio is preferably 90% by mass or more, more preferably 95% by mass or more, and even more preferably 97% by mass or more. The higher the purity of the calcium carbonate particles, the higher the environmental safety. The load on the environment can be further reduced in the case where the content of calcium carbonate in the calcium carbonate particles by ratio is 90% by mass or more.

The calcium carbonate particles are preferably 20 μm or less in maximum particle size. Here, voids may exist at the interface between the calcium carbonate particles and the first thermoplastic resin, in the inner layer. The laminate of the present invention can exhibit excellent formability as the inner layer has fewer voids. It is judged that the larger the particle size of the calcium carbonate particles, the more easily the above-mentioned voids are formed. The generation of voids at the interface between the calcium carbonate particles and the first thermoplastic resin can therefore be suppressed in the case where the calcium carbonate particles are 20 μm or less in maximum particle size. As a result, the formability of the laminate of the present invention can be further improved.

Note that the maximum particle size of calcium carbonate particles can be measured by the following method. First, the particle size (major axis) of calcium carbonate particles is measured, using an electron microscope, at five randomly selected points (field of view: 100 μm×100 μm) from the cross section of the inner layer. The maximum particle size of the calcium carbonate particles in the measurement results is taken as the maximum particle size of the calcium carbonate particles.

The calcium carbonate particles may be surface-treated calcium carbonate particles. Examples of surface treatment include silane coupling agent treatment and metal soap treatment (e.g., calcium stearate treatment). The calcium carbonate particles are surface-treated, thereby making it possible to suppress the generation of voids at the interface between the calcium carbonate particles and the first thermoplastic resin. As a result, the formability of the laminate of the present invention can be further improved.

The content of the inorganic filler in the inner layer by ratio is preferably 53% by mass or more and 70% by mass or less, and more preferably 55% by mass or more and 60% by mass or less. The cold impact resistance of the laminate of the present invention can be further improved in the case where the content of inorganic particles in the inner layer by ratio is 53% by mass or more. The stretchability of the inner layer can be improved in the case where the content of inorganic particles in the inner layer by ratio is 70% by mass or less.

The content, by ratio, of the inorganic filler in the laminate of the present invention is preferably more than 50% by mass, more preferably more than 50% by mass and 60% by mass or less, and even more preferably more than 50% by mass and 55% by mass or less. The heat resistance of the laminate of the present invention can be improved in the case where the content, by ratio, of inorganic filler in the laminate of the present invention is more than 50% by mass. In addition, the container and packaging formed by the laminate of the present invention are no longer subject to the recycling obligation defined by the Containers and Packaging Recycling Law. Furthermore, the amount of carbon dioxide emitted when incinerating the laminate of the present invention can be reduced. The use of a large amount of inorganic fillers can reduce the ingredient cost of the laminate of the present invention because inorganic fillers are generally less expensive than resins. The formability of the laminate of the present invention can be further improved in the case where the content, by ratio, of inorganic filler in the laminate of the present invention is 60% by mass or less.

The inner layer may contain different inorganic fillers other than calcium carbonate particles. Examples of the different inorganic fillers include calcium sulfate particles, barium sulfate particles, kaolin particles, mica particles, zinc oxide particles, dolomite particles, glass fibers, hollow glass microbeads, silica particles, chalk particles, talc, pigment particles, titanium dioxide particles, silicon dioxide particles, bentonites, clays, diatomaceous earth, and zeolites. Calcium carbonate particles are suitable as an inorganic filler because they are inexpensive and stably available as compared with the different inorganic fillers.

The content of calcium carbonate particles in the inorganic filler by ratio is preferably 90% by mass or more, and more preferably 100% by mass.

(First Thermoplastic Resin)

The first thermoplastic resin contained in the inner layer satisfies Condition A or Condition B described below.

Condition A is that a first polyethylene resin is contained, and the first polyethylene resin is 0.942 g/cm$^3$ or more and 0.970 g/cm$^3$ or less in density as well as 2.0 or more and 10.0 or less in polydispersity index (Mw/Mn).

Condition B is that: a second polyethylene resin and a third polyethylene resin are contained; the second polyethylene resin is 0.942 g/cm$^3$ or more and 0.970 g/cm$^3$ or less in density as well as more than 10.0 and 50.0 or less in polydispersity index (Mw/Mn); the third polyethylene resin is 0.850 g/cm$^3$ or more and less than 0.930 g/cm$^3$ in density; and the ratio of the mass of the third polyethylene resin to the total mass of the second polyethylene resin and the third polyethylene resin is 5% by mass or more and 30% by mass or less.

The first polyethylene resin is a high-density polyethylene resin with a low polydispersity index (Mw/Mn). The density of the first polyethylene resin is preferably 0.942 g/cm$^3$ or more and 0.970 g/cm$^3$ or less, and more preferably 0.950 g/cm$^3$ or more and 0.960 g/cm$^3$ or less. The polydispersity index (Mw/Mn) of the first polyethylene resin is preferably 2.0 or more and 10.0 or less, and more preferably 6.0 or more and 9.0 or less. The mass-average molecular weight (Mw) of the first polyethylene resin is preferably 100,000 or more and 1,000,000 or less, and more preferably 250,000 or more and 500,000 or less. The number-average molecular weight (Mn) of the first polyethylene resin is preferably 10,000 or more and 400,000 or less, and more preferably 30,000 or more and 60,000 or less. The cold impact resistance and rigidity of the laminate of the present invention can be improved in the case where each physical property of the first polyethylene resin is within the numerical range described above.

When the first thermoplastic resin satisfies Condition A, the first thermoplastic resin may contain only the first polyethylene resin, and preferably further contains the third polyethylene resin. When the first thermoplastic resin contains the first polyethylene resin and the third polyethylene resin, the ratio of the mass of the third polyethylene resin to the total mass of the first polyethylene resin and the third polyethylene resin is preferably 5% by mass or more and 30% by mass or less, and more preferably 15% by mass or more and 25% by mass or less. The cold impact resistance of the laminate of the present invention can be further improved in the case where the above ratio is 5% by mass or more. The rigidity of the laminate of the present invention can be further improved in the case where the above ratio is 30% by mass or less.

The second polyethylene resin is a high-density polyethylene resin with a large polydispersity index (Mw/Mn). The density of the second polyethylene resin is preferably 0.942 g/cm$^3$ or more and 0.970 g/cm$^3$ or less, and more preferably 0.950 g/cm$^3$ or more and 0.960 g/cm$^3$ or less. The polydispersity index (Mw/Mn) of the second polyethylene resin is preferably more than 10.0 and 50.0 or less, and more preferably 15.0 or more and 25.0 or less. The mass-average molecular weight (Mw) of the second polyethylene resin is preferably 100,000 or more and 2,000,000 or less, and more preferably 250,000 or more and 800,000 or less. The number-average molecular weight (Mn) of the second polyethylene resin is preferably 5,000 or more and 100,000 or less, and more preferably 10,000 or more and 30,000 or less. The cold impact resistance and rigidity of the laminate of the present invention can be improved in the case where each physical property of the second polyethylene resin is within the above numerical range.

Examples of the third polyethylene resin include low-density polyethylene resins having a branched structure, and linear low-density polyethylene resins. The former is 0.910 g/cm$^3$ or more and less than 0.930 g/cm$^3$ in density, for example. The latter is 0.850 g/cm$^3$ or more and less than 0.930 g/cm$^3$ in density, for example.

The density of the third polyethylene resin is preferably 0.850 g/cm$^3$ or more and less than 0.930 g/cm$^3$, and more preferably 0.870 g/cm$^3$ or more and less than 0.930 g/cm$^3$. The cold impact resistance and rigidity of the laminate of the present invention can be improved in the case where the density of the third polyethylene resin is within the above numerical range.

When the first thermoplastic resin satisfies Condition B, the ratio of the mass of the third polyethylene resin to the total mass of the second polyethylene resin and the third polyethylene resin is preferably 5% by mass or more and 30% by mass or less, and more preferably 8% by mass or more and 22% by mass or less. The cold impact resistance of the laminate of the present invention can be improved in the case where the above ratio is 5% by mass or more. The rigidity of the laminate of the present invention can be improved in the case where the above ratio is 30% by mass or less.

The first thermoplastic resin, which is small in amount, may further contain a different resin other than the first polyethylene resin, the second polyethylene resin, and the third polyethylene resin. Examples of the different resin include polyolefin resins (e.g. polypropylene and medium density polyethylene), ABS resins, polyamide resins, polystyrene resins, and polyester resins (e.g. polyethylene terephthalate resins and polybutylene terephthalate resins). The content of the different resin in the first thermoplastic resin by ratio is preferably 10% by mass or less, and more preferably 0% by mass. In other words, the total content, by ratio, of the first polyethylene resin, the second polyethylene resin, and the third polyethylene resin in the first thermoplastic resin is preferably over 90% by mass, and more preferably 100% by mass.

(Other Additives)

The inner layer may further contain other additives—additives other than the inorganic filler. Examples of the additives in question include coupling agents, lubricants, filler dispersants, antistatic agents, antioxidants, heat stabilizers, UV absorbers, and weathering stabilizers.

The content of inorganic filler in the inner layer by ratio is high as described above. Accordingly, the inner layer preferably contains a filler dispersant as other additives. The dispersibility of the inorganic filler can be improved in the case where the inner layer contains the filler dispersant. Examples of filler dispersants include metal soaps such as calcium stearate and magnesium stearate. In the case where the inner layer contains other additives, the content thereof in the inner layer by ratio is preferably 0.5% by mass or more and 5% by mass or less.

[Outer Layers]

The outer layers contain a second thermoplastic resin. The ratio of the thickness of each of the outer layers to the total thickness of the laminate of the present invention is preferably 2.0% or more and 20.0% or less, and more preferably 3.0% or more and 10.0% or less. The formability of the laminate of the present invention can be further improved in the case where the ratio of the thickness of each outer layer is 2.0% or more. The content, by ratio, of the inorganic filler in the laminate of the present invention can be easily adjusted to more than 50% by mass in the case where the ratio of the thickness of each outer layer is 20.0% or less. Note that the pair of outer layers may be the same or different in thicknesses.

Each thickness of the pair of outer layers is preferably 5 μm or more and 80 μm or less, and more preferably 10 μm or more and 50 μm or less. The formability of the laminate of the present invention can be further improved in the case where the outer layers are 5 μm or more in thickness. The content, by ratio, of the inorganic filler in the laminate of the present invention can be easily adjusted to more than 50% by mass in the case where the outer layers are 80 μm or less in thickness.

(Second Thermoplastic Resin)

A second thermoplastic resin contained in the outer layers satisfies Condition A or Condition B described above. The details of the second thermoplastic resin contained in the outer layers, and the details of a first polyethylene resin, a second polyethylene resin, and a third polyethylene resin contained in the second thermoplastic resin may be the same as, for example, those of the first thermoplastic resin, the first polyethylene resin, the second polyethylene resin, and the third polyethylene resin in the inner layer. In the laminate of the present invention, the first thermoplastic resin and the second thermoplastic resin preferably have the same composition.

The content of the second thermoplastic resin in the outer layers by ratio is preferably 90% by mass or more, and more preferably 95% by mass or more. The total content, by ratio, of the first polyethylene resin, the second polyethylene resin, and the third polyethylene resin in the second thermoplastic resin is preferably more than 90% by mass, and more preferably 100% by mass.

The outer layers preferably contain no inorganic filler, but may contain a small amount of inorganic filler. The content of the inorganic filler in the outer layers by ratio is preferably 5% by mass or less, and more preferably 0% by mass.

[Manufacturing Method]

The laminate of the present invention may be manufactured by a known multilayer T-die method, for example. Specifically, first, inner layer forming ingredients (ingredients containing a first thermoplastic resin and an inorganic filler) and outer layer forming ingredients (ingredients containing a second thermoplastic resin) are prepared. The laminate of the present invention can be obtained by extruding the inner layer forming ingredients and the outer layer forming ingredients separately from a plurality of extruders and sticking them in layers inside a T-die. However, the method for manufacturing the laminate of the present invention is not limited to the multilayer T-die method.

Second Embodiment: Food Container and Packaging

Frozen food container and packaging according to a second embodiment of the present invention are obtained by forming the laminate according to the first embodiment. Examples of specific uses of the frozen food container and packaging of the present invention include lunch boxes, food packs, trays, dishes, cups, and cup lids. The frozen food container and packaging of the present invention are obtained by forming thereinto the laminate according to the first embodiment, and therefore excellent at cold impact resistance and rigidity and has a low environmental load.

The frozen food container and packaging of the present invention have the same layer structure as the laminate according to the first embodiment. However, in the frozen food container and packaging of the present invention, the thickness of each layer may be changed by stretching during forming as compared with the laminate according to the first embodiment. For example, the thickness of the frozen food container and packaging of the present invention may vary from part to part. In this case, in the frozen food container and packaging of the present invention, the thickness ratio of the thickest portion to the thinnest portion is preferably 2.0 times or more and 4.5 times or less, and more preferably 3.5 times or more and 4.5 times or less.

EXAMPLES

The present invention will be further described below with reference to examples. However, the present invention is not limited to the examples.

[Ingredients]

First, ingredients used in the examples will be described.

$CaCO_3$: Calcium carbonate particles, about 20 μm in maximum particle size

Talc: 12 μm in average particle size

HDPE-A: High-density polyethylene resin ("B5803" manufactured by Keiyo Polyethylene Co., Ltd.), Mw: 380,000, Mn: 19,000, Mw/Mn: 20.0, density: 0.957 $g/cm^3$ HDPE-B: High-density polyethylene resin ("E8040" manufactured by Keiyo Polyethylene Co., Ltd.), Mw: 370,000, Mn: 47,000, Mw/Mn: 7.9, density: 0.957 $g/cm^3$ PP: Block polypropylene resin ("E702MG" manufactured by Prime Polymer Co., Ltd.)

LDPE: Low-density polyethylene resin having branched structure ("LF128" manufactured by Japan Polyethylene Co., Ltd.), density: 0.922 $g/cm^3$ LLDPE-A: Linear low-density polyethylene resin ("KS240T" manufactured by Japan Polyethylene Co., Ltd.), density: 0.880 $g/cm^3$ LLDPE-B: Linear low-density polyethylene resin ("SP1520" manufactured by Prime Polymer Co., Ltd.), density: 0.912 $g/cm^3$ A second polyethylene resin was HDPE-A of the ingredients described above. A first polyethylene resin was HDPE-B. A third polyethylene resins was LDPE, LLDPE-A, and LLDPE-B. Hereinafter, HDPE-A, HDPE-B and PP may be collectively referred to as base resins. LDPE, LLDPE-A, and LLDPE-B may also collectively referred to as resin additives.

Example 1

A masterbatch of inner layer forming ingredients and outer layer forming ingredients was obtained by kneading the following ingredients with a twin-screw kneader and then chipping the kneaded ingredients.

Inner layer forming ingredients: $CaCO_3$ (58 parts by mass), HDPE-A (38 parts by mass), and LLDPE-A (4 parts by mass)

Outer layer forming ingredients: HDPE-A (90 parts by mass) and LLDPE-A (10 parts by mass)

Note that the inner layer forming ingredients and the outer layer forming ingredients contained a first thermoplastic resin and a second thermoplastic resin, respectively. Each of the first thermoplastic resin and the second thermoplastic resin contained a second polyethylene resin (HDPE-A) and a third polyethylene resin (LLDPE-A). In each of the first thermoplastic resin and the second thermoplastic resin, the ratio of the mass of the third polyethylene resin (LLDPE-A) to the total mass of the second polyethylene resin (HDPE-A) and the third polyethylene resin (LLDPE-A) was 10% by mass. From the above, each of the first thermoplastic resin and the second thermoplastic resin satisfied Condition B.

A multilayer T-die method was used to form a laminate including an inner layer and a pair of outer layers laminated on both sides of the inner layer. The inner layer was formed by the inner layer forming ingredients described above. Each of the pair of outer layers was formed by the above-described outer layer forming ingredients. The laminate was 300 μm in total thickness. The inner layer was 270 μm in thickness (90% of the total thickness of the laminate). Each of the pair of outer layers was 15 μm in thickness (5% of the total thickness of the laminate). The content of the inorganic filler in the laminate by ratio was 52% by mass. This example corresponds to the laminate of Example 1.

Examples 2 to 6 and Comparative Examples 1 to 9

Respective laminates of Examples 2 to 6 and Comparative Examples 1 to 9 were formed in the same manner as the laminate of Example 1, except that the compositions of respective inner and outer layer forming ingredients were changed as depicted in Tables 1 and 2 below.

Comparative Example 10

A masterbatch of single-layer forming ingredients was obtained by kneading the ingredients described below with a twin-screw kneader and then chipping them.

Single-layer forming ingredients: talc (15 parts by mass) and PP (85 parts by mass)

A single-layer material sheet was formed by the T-die method. The single-layer material sheet was 300 μm in thickness. The content of inorganic filler in the single-layer material sheet by ratio was 15% by mass. This example corresponds to a single-layer body of Comparative Example 10.

Comparative Example 11

A masterbatch of a single-layer forming ingredient was obtained by kneading the ingredient described below with a twin-screw kneader and then chipping them.

Single-layer forming ingredient: PP (100 parts by mass)

A single-layer material sheet was formed by the T-die method. The single-layer material sheet was 300 μm in thickness. The content of inorganic filler in the single-layer material sheet by ratio was 0% by mass. This example corresponds to a single-layer body of Comparative Example 11.

Note that each of Examples 10 and 11 is a single-layer body having a composition close to that of material sheets used for forming conventional frozen food containers and packaging.

In Tables 1 and 2 below, "parts" indicate parts by mass. The "ratio" of resin additive indicates the ratio of the mass of the resin additive to the total mass of the thermoplastic resin. "A" and "B" in "Conditions" of the thermoplastic resin indicate that Condition A and Condition B described above are satisfied, respectively. "–" in "Condition" of the thermoplastic resin indicates that neither of Condition A and Condition B described above is satisfied.

TABLE 1

| | | | | Thermoplastic resin | | | | | | | |
|---|---|---|---|---|---|---|---|---|---|---|---|
| | | Inorganic particles | | Base resins | | | Resin additives | | | | |
| | | $CaCO_3$ [Parts] | Talc [Parts] | HDPE-A [Parts] | HDPE -B [Parts] | PP [Parts] | LDPE [Parts] | LLD PE-A [Parts] | LLD PE-B [Parts] | Rate [%] | Condition |
| Example 1 | Inner layer | 58 | — | 38 | — | — | — | 4 | — | 10 | B |
| | Outer layer | — | — | 90 | — | — | — | 10 | — | 10 | B |
| | Whole | 52 | — | 43 | — | — | — | 5 | — | 10 | B |

TABLE 1-continued

| | | Inorganic particles | | Thermoplastic resin: Base resins | | | Thermoplastic resin: Resin additives | | | | |
|---|---|---|---|---|---|---|---|---|---|---|---|
| | | $CaCO_3$ [Parts] | Talc [Parts] | HDPE-A [Parts] | HDPE -B [Parts] | PP [Parts] | LDPE [Parts] | LLD PE-A [Parts] | LLD PE-B [Parts] | Rate [%] | Condition |
| Example 2 | Inner layer | 58 | — | 34 | — | — | — | 8 | — | 19 | B |
| | Outer layer | — | — | 81 | — | — | — | 19 | — | 19 | B |
| | Whole | 52 | — | 39 | — | — | — | 9 | — | 19 | B |
| Example 3 | Inner layer | 58 | — | — | 42 | — | — | — | — | — | A |
| | Outer layer | — | — | — | 100 | — | — | — | — | — | A |
| | Whole | 52 | — | — | 48 | — | — | — | — | — | A |
| Example 4 | Inner layer | 58 | — | — | 34 | — | — | 8 | — | 19 | A |
| | Outer layer | — | — | — | 81 | — | — | 19 | — | 19 | A |
| | Whole | 52 | — | — | 39 | — | — | 9 | — | 19 | A |
| Example 5 | Inner layer | 58 | — | — | 34 | — | 8 | — | — | 19 | A |
| | Outer layer | — | — | — | 81 | — | 19 | — | — | 19 | A |
| | Whole | 52 | — | — | 39 | — | 9 | — | — | 19 | A |
| Example 6 | Inner layer | 58 | — | — | 34 | — | — | — | 8 | 19 | A |
| | Outer layer | — | — | — | 81 | — | — | — | 19 | 19 | A |
| | Whole | 52 | — | — | 39 | — | — | — | 9 | 19 | A |
| Comparative Example 1 | Inner layer | 58 | — | 42 | — | — | — | — | — | — | — |
| | Outer layer | — | — | 100 | — | — | — | — | — | — | — |
| | Whole | 52 | — | 48 | — | — | — | — | — | — | — |
| Comparative Example 2 | Inner layer | 58 | — | — | — | 42 | — | — | — | — | — |
| | Outer layer | — | — | — | — | 100 | — | — | — | — | — |
| | Whole | 52 | — | — | — | 48 | — | — | — | — | — |

TABLE 2

| | | Inorganic particles | | Thermoplastic resin: Base resins | | | Thermoplastic resin: Resin additives | | | | |
|---|---|---|---|---|---|---|---|---|---|---|---|
| | | $CaCO_3$ [Parts] | Takc [Parts] | HDPE-A [Parts] | HDPE -B [Parts] | PP [Parts] | LDPE [Parts] | LLD PE-A [Parts] | LLD PE-B [Parts] | Rate [%] | Condition |
| Comparative Example 3 | Inner layer | 58 | — | — | — | 34 | 8 | — | — | 19 | — |
| | Outer layer | — | — | — | — | 81 | 19 | — | — | 19 | — |
| | Whole | 52 | — | — | — | 39 | 9 | — | — | 19 | — |
| Comparative Example 4 | Inner layer | 58 | — | — | — | 26 | 16 | — | — | 38 | — |
| | Outer layer | — | — | — | — | 62 | 38 | — | — | 38 | — |
| | Whole | 52 | — | — | — | 30 | 18 | — | — | 38 | — |
| Comparative Example 5 | Inner layer | 58 | — | 8 | — | 34 | — | — | — | — | — |
| | Outer layer | — | — | 19 | — | 81 | — | — | — | — | — |
| | Whole | 52 | — | 9 | — | 39 | — | — | — | — | — |
| Comparative Example 6 | Inner layer | 58 | — | 16 | — | 26 | — | — | — | — | — |
| | Outer layer | — | — | 38 | — | 62 | — | — | — | — | — |
| | Whole | 52 | — | 18 | — | 30 | — | — | — | — | — |
| Comparative Example 7 | Inner layer | 58 | — | — | — | 34 | — | 8 | — | 19 | — |
| | Outer layer | — | — | — | — | 81 | — | 19 | — | 19 | — |
| | Whole | 52 | — | — | — | 39 | — | 9 | — | 19 | — |
| Comparative Example 8 | Inner layer | 58 | — | — | — | 26 | — | 16 | — | 38 | — |
| | Outer layer | — | — | — | — | 62 | — | 38 | — | 38 | — |
| | Whole | 52 | — | — | — | 30 | — | 18 | — | 38 | — |
| Comparative Example 9 | Inner layer | 58 | — | 26 | — | — | — | 16 | — | 38 | — |
| | Outer layer | — | — | 62 | — | — | — | 38 | — | 38 | — |
| | Whole | 52 | — | 30 | — | — | — | 18 | — | 38 | — |
| Comparative Example 10 | Single layer | — | 15 | — | — | 85 | — | — | — | — | — |
| Comparative Example 11 | Single layer | — | — | — | — | 100 | — | — | — | — | — |

<Evaluation>

Each laminate (or single-layer body) of Examples 1 to 6 and Comparative Examples 1 to 11 was evaluated for cold impact resistance, rigidity, and eco-friendliness (low environmental load) by the following methods. The evaluation results are depicted in Table 3 below.

[Cold Impact Resistance]

The 50% breaking energy was measured according to JIS (Japanese Industrial Standards) K7211-1:2006 for the laminates (or single-layer bodies) as evaluation targets, using an impact tester ("DuPont type drop impact tester with cryostat No. 603-L" manufactured by Mize Tester Co., Ltd.). First, each test piece cut into a rectangular shape of 50 mm×50 mm was prepared as the evaluation targets. The operation of dropping a weight of constant mass from various heights onto multiple test pieces is then repeated, and the energy when 50% of all the test pieces break (50% breaking energy) is measured. The measurement conditions were that a weight mass was 200 g and a measurement temperature was −20°

C. (low temperature environment). In this test, the cold impact resistance of the evaluation targets can be numerically measured as 50% breaking energy [J]. Specifically, the higher the 50% breaking energy of the evaluation targets, the higher the cold impact resistance of the evaluation targets.

The cold impact resistance of the evaluation targets was determined according to the following criteria.

A (passed): 50% breaking energy is 0.50 J or more

B (failed): 50% breaking energy is less than 0.50 J

[Rigidity]

A tensile test was measured according to JIS (Japanese Industrial Standards) K7161-1:2014 for the laminates (or single-layer bodies) as evaluation targets, using a tensile testing machine ("201X type testing machine" manufactured by Intesco Co., Ltd.). First, each evaluation target cut into a shape (dumbbell shape) of "test piece type 5" (JIS (Japanese Industrial Standard) K7127:2009) was prepared. A tensile test was performed on each test piece under conditions of a chuck-to-chuck distance of 80 mm and a tensile speed of 20 mm/min with both ends of the obtained test piece clamped with chucks of a tensile tester. After the test, the dimensions of the test piece were measured, and the tensile elastic modulus of the test piece was calculated. In this test, the rigidity of the evaluation targets can be numerically measured as a tensile elastic modulus [MPa]. Specifically, the higher the tensile elastic modulus of the evaluation targets, the higher the rigidity of the evaluation targets.

The rigidity of the evaluation targets was determined according to the following criteria.

A (passed): tensile elastic modulus is 1500 MPa or more

B (failed): tensile elastic modulus is less than 1500 MPa

[Eco-Friendliness]

The eco-friendliness of each laminate (or single-layer body) as an evaluation target was determined according to the following criteria depending on the composition of the ingredients of each evaluation target.

A (passed): content of resin by ratio is less than 50% by mass

B (failed): content of resin by ratio is 50% by mass or more

TABLE 3

| | Cold impact resistance (−20° C.) | | Rigidity | | |
|---|---|---|---|---|---|
| | 50% breaking energy [J] | Determined | Tensile elastic modulus [MPa] | Determined | Eco-friendliness |
| Example 1 | 0.5 | A | 2570 | A | A |
| Example 2 | 0.62 | A | 1990 | A | A |
| Example 3 | 0.88 | A | 2890 | A | A |
| Example 4 | 0.82 | A | 1680 | A | A |
| Example 5 | 0.71 | A | 2490 | A | A |
| Example 6 | 0.78 | A | 2360 | A | A |
| Comparative Example 1 | 0.35 | B | 3300 | A | A |
| Comparative Example 2 | 0.21 | B | 2850 | A | A |
| Comparative Example 3 | 0.23 | B | 2250 | A | A |
| Comparative Example 4 | 0.25 | B | 1800 | A | A |
| Comparative Example 5 | 0.22 | B | 3010 | A | A |
| Comparative Example 6 | 0.25 | B | 3210 | A | A |
| Comparative Example 7 | 0.34 | B | 1940 | A | A |
| Comparative Example 8 | 0.63 | A | 880 | B | A |
| Comparative Example 9 | 0.89 | A | 700 | B | A |
| Comparative Example 10 | 0.6 | A | 2300 | A | B |
| Comparative Example 11 | 0.5 | A | 1310 | B | B |

Each laminate of Examples 1 to 6 included an inner layer and a pair of outer layers laminated on both sides of the inner layer. The inner layer contained an inorganic filler and a first thermoplastic resin. Each of the outer layers contained a second thermoplastic resin. The inorganic filler included calcium carbonate particles. A content of the inorganic filler in the laminate by ratio was more than 50% by mass. Each of the first thermoplastic resin and the second thermoplastic resin satisfied Condition A or Condition B. Each laminate of Examples 1 to 6 was excellent at cold impact resistance and rigidity, and had a low environmental load. In addition, each laminate of Examples 1 to 6 has a three-layer structure in which the inner layer is covered with the outer layers having excellent stretchability, and therefore judged to be excellent at formability.

On the other hand, the laminate of Comparative Example 1 contained only a second polyethylene resin in each of the first thermoplastic resin and the second thermoplastic resin. The second polyethylene resin is judged to be difficult to maintain its strength and function as a binder resin at low temperatures. The laminate of Comparative Example 1 therefore failed in cold impact resistance.

The laminate of Comparative Example 2 contained only block polypropylene resin in each of the first thermoplastic resin and the second thermoplastic resin. The block polypropylene resin is judged to be difficult to maintain its own strength and function as a binder resin at low temperatures. The laminate of Comparative Example 2 therefore failed in cold impact resistance.

Each laminate of Comparative Examples 3 to 7 contained a block polypropylene resin and a second polyethylene resin or a third polyethylene resin in various compounding ratios in each of the first thermoplastic resin and the second thermoplastic resin. The block polypropylene resin is judged to be difficult to maintain its own strength and function as a binder resin at low temperatures even when used in combination with various resin additives. Respective laminates of Comparative Examples 3 to 7 therefore failed in cold impact resistance.

The laminate of Comparative Example 8 contained a block polypropylene resin and a large amount of third polyethylene resin in each of the first thermoplastic resin and the second thermoplastic resin. The block polypropylene resin successfully maintained its own strength and function as a binder resin at low temperatures in combination with a large amount of third polyethylene resin. On the other hand, a thermoplastic resin containing a large amount of third polyethylene resin is judged to reduce rigidity. The laminate of Comparative Example 8 therefore failed in rigidity.

The laminate of Comparative Example 9 contained a second polyethylene resin and a large amount of third polyethylene resin in each of the first thermoplastic resin and the second thermoplastic resin. The second polyethylene resin successfully maintained its own strength and function as a binder resin at low temperatures in combination with a large amount of third polyethylene resin. On the other hand, a thermoplastic resin containing a large amount of third polyethylene resin is judged to reduce rigidity. The laminate of Comparative Example 9 therefore failed in rigidity.

The single-layer body of Comparative Example 10 contained a block polypropylene resin and a small amount of talc in the thermoplastic resin. The single-layer body of Comparative Example 10 passed cold impact resistance and rigidity. The single-layer body however failed in eco-friendliness because the resin is used as a main ingredient.

The single-layer body of Comparative Example 11 contained only a block polypropylene resin in the thermoplastic resin. The block polypropylene alone is judged not to exhibit sufficient rigidity. The single-layer body of Comparative Example 11 therefore failed in rigidity. The single-layer body of Comparative Example 11 also failed in eco-friendliness because the resin is used as a main ingredient.

From the above results, the laminate of the present invention is judged to be excellent at formability, cold impact resistance, and rigidity, and to have a low environmental load. In particular, the laminate of the present invention is judged to exhibit cold impact resistance and rigidity equal to or greater than that of the material sheets used for forming conventional frozen food containers and packaging (Comparative Examples 10 and 11) in spite of the fact that the load on the environment is low. Moreover, the frozen food container and packaging of the present invention are obtained by forming the above-mentioned laminate, and therefore judged to be excellent at cold impact resistance and rigidity, and to have a low environmental load.

INDUSTRIAL APPLICABILITY

The laminate of the present invention can be used as a container and packaging material. The frozen food container and packaging of the present invention can be used for selling frozen food.

The invention claimed is:

1. A laminate, comprising an inner layer and a pair of outer layers laminated on both sides of the inner layer, wherein the inner layer contains an inorganic filler and a first thermoplastic resin, each of the outer layers contains a second thermoplastic resin, the inorganic filler includes calcium carbonate particles, a content of the inorganic filler in the laminate by ratio is more than 50% by mass, each of the first thermoplastic resin and the second thermoplastic resin satisfies Condition A or B, wherein Condition A is that a first polyethylene resin is contained, and the first polyethylene resin is 0.942 g/cm3 or more and 0.970 g/cm3 or less in density as well as 2.0 or more and 10.0 or less in polydispersity index (Mw/Mn), Condition B is that: a second polyethylene resin and a third polyethylene resin are contained; the second polyethylene resin is 0.942 g/$cm^3$ or more and 0.970 g/$cm^3$ or less in density as well as more than 10.0 and 50.0 or less in polydispersity index (Mw/Mn); the third polyethylene resin is 0.850 g/$cm^3$ or more and less than 0.930 g/$cm^3$ in density; and a ratio of mass of the third polyethylene resin to total mass of the second polyethylene resin and the third polyethylene resin is 5% by mass or more and 30% by mass or less, wherein a total content, by ratio, of resin other than the first polyethylene resin, the second polyethylene resin, and the third polyethylene resin in each of the first thermoplastic resin and the second thermoplastic resin is less than 10% by mass, wherein a total thickness of the laminate is 200 μm or more and 1000 μm or less, and wherein a ratio of each thickness of the outer layers to a total thickness of the laminate is 2.0% or more and 20.0% or less.

2. The laminate according to claim 1, wherein a content of the inorganic filler in the inner layer by ratio is 53% by mass or more and 70% by mass or less.

3. The laminate according to claim 1, wherein the total content, by ratio, of the resin other than the first polyethylene resin, the second polyethylene resin, and the third polyethylene resin in each of the first thermoplastic resin and the second thermoplastic resin is 0% by mass.

4. Frozen food container formed by forming a laminate according to claim 1.

5. Frozen food packaging formed by forming a laminate according to claim 1.

6. A laminate, comprising an inner layer and a pair of outer layers laminated on both sides of the inner layer, wherein the inner layer contains an inorganic filler and a first thermoplastic resin, each of the outer layers contains a second thermoplastic resin, the inorganic filler includes calcium carbonate particles, a content of the inorganic filler in the laminate by ratio is more than 50% by mass, each of the first thermoplastic resin and the second thermoplastic resin satisfies Condition A or B, wherein Condition A is that a first polyethylene resin is contained, and optionally a third polyethylene resin is contained with the first polyethylene resin, the first polyethylene resin is 0.942 g/$cm^3$ or more and 0.970 g/$cm^3$ or less in density as well as 2.0 or more and 10.0 or less in polydispersity index (Mw/Mn), the third polyethylene resin is 0.850 g/$cm^3$ or more and less than 0.930 g/$cm^3$ in density, and a ratio of mass of the third polyethylene resin to total mass of the first polyethylene resin and the third polyethylene resin is 30% by mass or less, Condition B is that: a second polyethylene resin and the third polyethylene resin are contained; the second polyethylene resin is 0.942 g/$cm^3$ or more and 0.970 g/$cm^3$ or less in density as well as more than 10.0 and 50.0 or less in polydispersity index (Mw/Mn); and a ratio of mass of the third polyethylene resin to total mass of the second polyethylene resin and the third polyethylene resin is 5% by mass or more and 30% by mass or less, wherein a total content, by ratio, of resin other than the first polyethylene resin, the second polyethylene resin, and the third polyethylene resin in each of the first thermoplastic resin and the second thermoplastic resin is less than 10% by mass.

7. The laminate according to claim 6, wherein a total thickness of the laminate is 200 μm or more and 1000 μm or less.

8. The laminate according to claim 6, wherein a ratio of each thickness of the outer layers to a total thickness of the laminate is 2.0% or more and 20.0% or less.

9. The laminate according to claim 6, wherein a content of the inorganic filler in the inner layer by ratio is 53% by mass or more and 70% by mass or less.

10. The laminate according to claim 6, wherein the total content, by ratio, of the resin other than the first polyethylene resin, the second polyethylene resin, and the third polyethylene resin in each of the first thermoplastic resin and the second thermoplastic resin is 0% by mass.

11. Frozen food container formed by forming a laminate according to claim 6.

12. Frozen food packaging formed by forming a laminate according to claim 6.

* * * * *